United States Patent [19]

Ohashi et al.

[11] Patent Number: 5,175,760
[45] Date of Patent: Dec. 29, 1992

[54] COMMUNICATION APPARATUS HAVING DATA TRANSFER FUNCTION

[75] Inventors: Takeo Ohashi, Atsugi; Hiroyuki Kudose, Isehara, both of Japan

[73] Assignee: Ricoh Company, Ltd., Tokyo, Japan

[21] Appl. No.: 558,474

[22] Filed: Jul. 27, 1990

[30] Foreign Application Priority Data

Aug. 1, 1989 [JP] Japan .................................. 1-199834

[51] Int. Cl.$^5$ ............................................. H04M 1/64
[52] U.S. Cl. ........................................ 379/67; 379/88; 379/100; 379/212; 358/407
[58] Field of Search ........................ 375/67, 69, 88, 89, 375/212, 211, 100; 379/100; 358/402, 407, 403

[56] References Cited

U.S. PATENT DOCUMENTS

| | | | |
|---|---|---|---|
| 4,406,925 | 9/1983 | Jordan et al. | 379/93 |
| 4,646,160 | 2/1987 | Iizuka et al. | 379/100 |
| 4,807,279 | 2/1989 | McClure et al. | 379/211 |
| 4,847,890 | 7/1989 | Solomon et al. | 379/67 |
| 4,873,713 | 10/1989 | Yamanouchi et al. | 379/88 |
| 4,956,860 | 9/1990 | Murata | 379/100 |
| 4,994,926 | 2/1991 | Gordon et al. | 358/436 |
| 5,055,945 | 10/1991 | Oguma et al. | 358/437 |

OTHER PUBLICATIONS

"Introducing PIC SuperFax", Pacific Image Brochure, (3 pages).

Primary Examiner—Jin F. Ng
Assistant Examiner—Huyen D. Le
Attorney, Agent, or Firm—Oblon, Spivak, McClelland, Maier & Neustadt

[57] ABSTRACT

A communication apparatus which replies to a call from a calling terminal and records information being received from the calling terminal for transferring the recorded information to a predetermined destination terminal. The communication apparatus comprises a recording part for recording the information received from the calling information after replying to the call, a memory part for storing a plurality of transfer time period data and a plurality of telephone number data of destination terminals corresponding to the plurality of transfer time period data, and a transferring part for transferring the information to the predetermined destination terminal by reading out the information from the recording part after the information is received from the calling terminal, so that the communication apparatus calls a subject destination terminal with a telephone number data relevant to the transfer time period data stored in the memory part corresponding to the current time when the call is received from the calling terminal, and transfers the information to the subject destination terminal each time the call is received from the calling terminal.

8 Claims, 4 Drawing Sheets

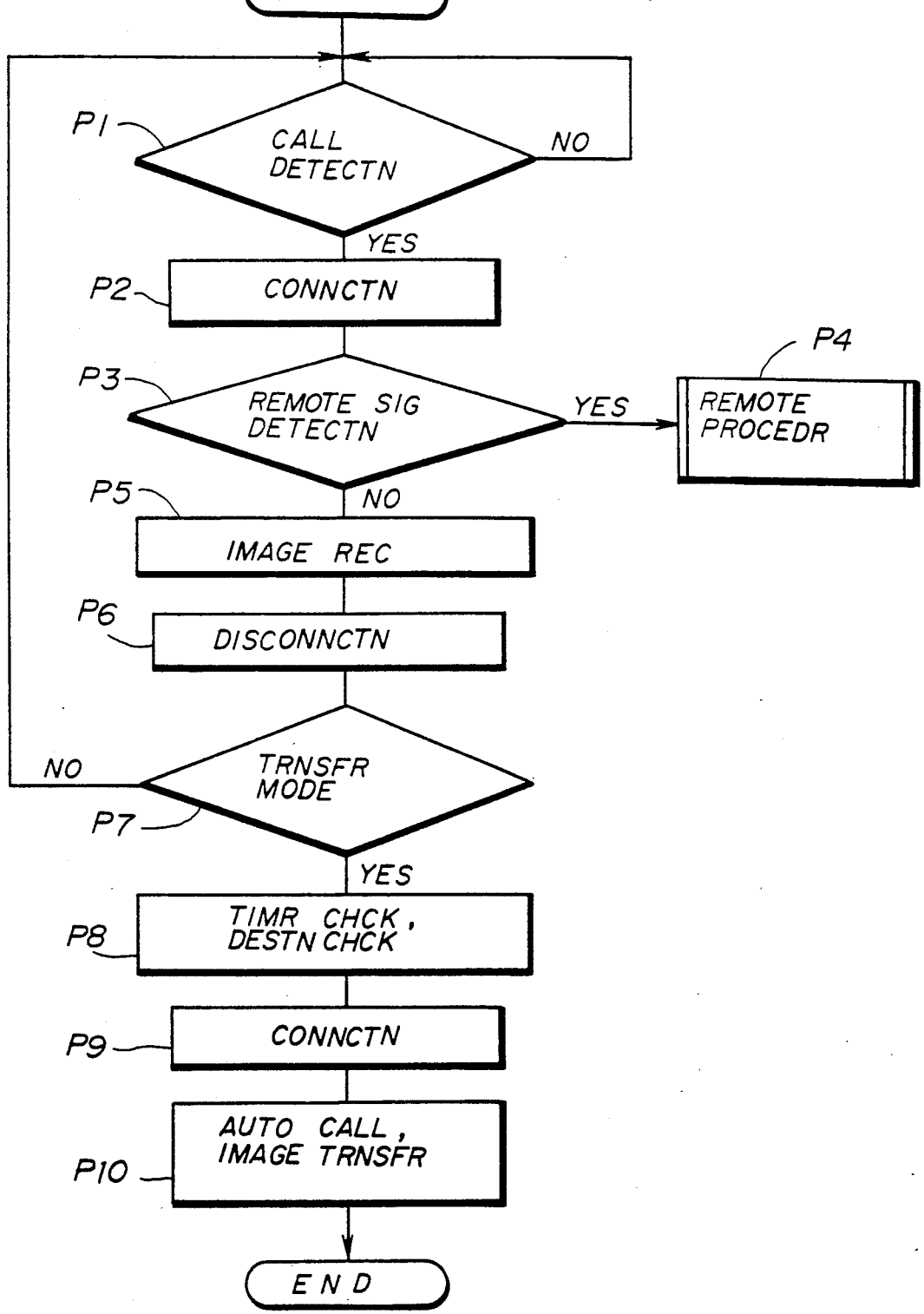

COMMUNICATION APPARATUS HAVING DATA TRANSFER FUNCTION

BACKGROUND OF THE INVENTION

The present invention generally relates to communication apparatus having a data transfer function, and more particularly to a communication apparatus which records a received information from a calling terminal and automatically calls a predetermined destination terminal so that the recorded information is transferred to the predetermined destination terminal.

Recently, communication terminals have been designed to have an enhanced data transmission capability. For example, a telephone apparatus which features an absence recording capability is developed and commercially available. The absence recording described herein is a capability or function of a communication apparatus to automatically reply to a call when received from a calling terminal through a data transmission path during the absence of an operator and operate for recording a speech message or image data received from the calling terminal onto a data storage medium such as a magnetic tape, an IC card or the like which is provided within the communication apparatus. However, such a conventional absence recording is designed only for accomplishing a simple task of recording a message or image received from a counterparty. The recorded information is not available to the operator of the apparatus who is out and visits a place distant from the location of the apparatus. The only and earliest method for the operator to receive the recorded information is to reproduce the recorded information with the apparatus when he returns to his home or office where the apparatus is located.

Further, a conventional communication apparatus having a data transfer capability is developed and commercially available. The data transfer described herein specifically is an improved capability or function of a communication apparatus to automatically call a predetermined destination terminal and transfer the information from any calling terminal being recorded in the data storage medium to the predetermined destination terminal to make the information available to the operator. In such a communication apparatus having the data transfer capability, for example, a telephone apparatus, the operator before going out must carry out a procedure for registering a telephone number of a destination telephone terminal to be recorded in the telephone apparatus. In this case, the conventional telephone apparatus stores the registration data of a single destination terminal's telephone number only. However, the need to transfer the recorded information to a different destination terminal from the destination terminal does frequently arise because the destination which the operator will visit is altered for any reason or a separate destination terminal should be specified depending on when and where the operator will actually visit. To allow modification of the destination terminal to which the recorded information is transferred, there are also several telephone apparatus having an improved capability which are commercially available. One of those telephone apparatus is capable of changing or deleting the recorded destination terminal data by a remote operation of sending a tone signal to that telephone apparatus from an external telephone terminal. Another one of such improved telephone apparatus is capable of reproducing the absence-recorded message by remote control using an external telephone terminal.

Similarly, there is a facsimile apparatus which has the above mentioned data transfer capability, as disclosed, for example, in Japanese Published Patent Appln. No. 94767/1988. In such a facsimile apparatus, image information when a call is received during absence of an operator is stored in an image memory part of the facsimile apparatus, and once a prescribed dial pulse is received from an external telephone terminal the absence-recorded image information is transferred to a predetermined destination terminal.

However, the conventional communication apparatus of the type described above requires a further improvement being made for the ease to use and the convenience for the user. In such an apparatus storing only one destination terminal data for the data transfer, it is necessary to make a reentry of the destination terminal data when the data already recorded must be changed. This is a troublesome task for the user who must modify the destination terminal data each time the destination place is altered, especially when two or more destination places are scheduled to visit on the same day.

In addition, in the case of the conventional facsimile apparatus, it is possible to store a plurality of telephone numbers of destination terminals which correspond with respective dial pulses. After answering a call from a calling terminal, the conventional facsimile apparatus, if a dial pulse is received from the calling terminal, calls a predetermined destination terminal corresponding to the dial pulse and transfers the received image information to the destination terminal. To transfer the image information to the destination terminal at a place which the user visits, the user must transmit the prescribed dial pulse to the facsimile apparatus by a remote operation. This is often a time-consuming, troublesome task for the user. And, before the data transfer, the user cannot check at his destination place if there is a received image information in the facsimile apparatus. Therefore, the conventional communication apparatus still has a problem concerning the ease to use and the convenience for the user.

SUMMARY OF THE INVENTION

Accordingly, it is a general object of the present invention to provide a novel and useful communication apparatus in which the above described problems are eliminated.

Another and more specific object of the present invention is to provide a communication apparatus which replies to a call from a calling terminal through a data transmission path and records information being received from the calling terminal for transferring the recorded information to a predetermined destination terminal, the communication apparatus comprising, a recording part for recording the information received from the calling information after replying to the call, a memory part for storing a plurality of transfer time period data and a plurality of telephone number data of destination terminals corresponding to the plurality of transfer time period data, and a transferring part for transferring the information to the predetermined destination terminal by reading out the information from the recording part after the information is received from the calling terminal, so that the communication apparatus calls a subject destination terminal with a telephone number data relevant to the transfer time period data stored in the memory part corresponding to the current time when the call is received from the calling terminal, and transfers the information recorded in the recording part to the subject destination terminal each time the call is received from the calling terminal. According to the present invention, it is possible to automatically transfer the absence-recorded information to the destination terminal relevant to the transfer time period recorded in the memory part corresponding to the current time when the call is received, without causing the need to give a instruction to modify the destination place to the communication apparatus remotely from the visiting place. And, in the case where a single communication apparatus is used in common by a number of users, it is possible to make effective use of the single communication apparatus by previously registering a different destination terminal for a separate transfer time period for each user so that the absence-recorded information is obtained at such a place that each user will visit. Therefore, the convenience and availability of the communication apparatus having the absence recording capability further improve.

Other objects and further features of the present invention will be apparent from the following detailed description when read in conjunction with the accompanying drawings.

BRIEF DESCRIPTION OF THE DRAWINGS

FIG. 4 is a flow chart of the data transfer procedure of the second embodiment.

DESCRIPTION OF THE PREFERRED EMBODIMENTS

Figure 1:
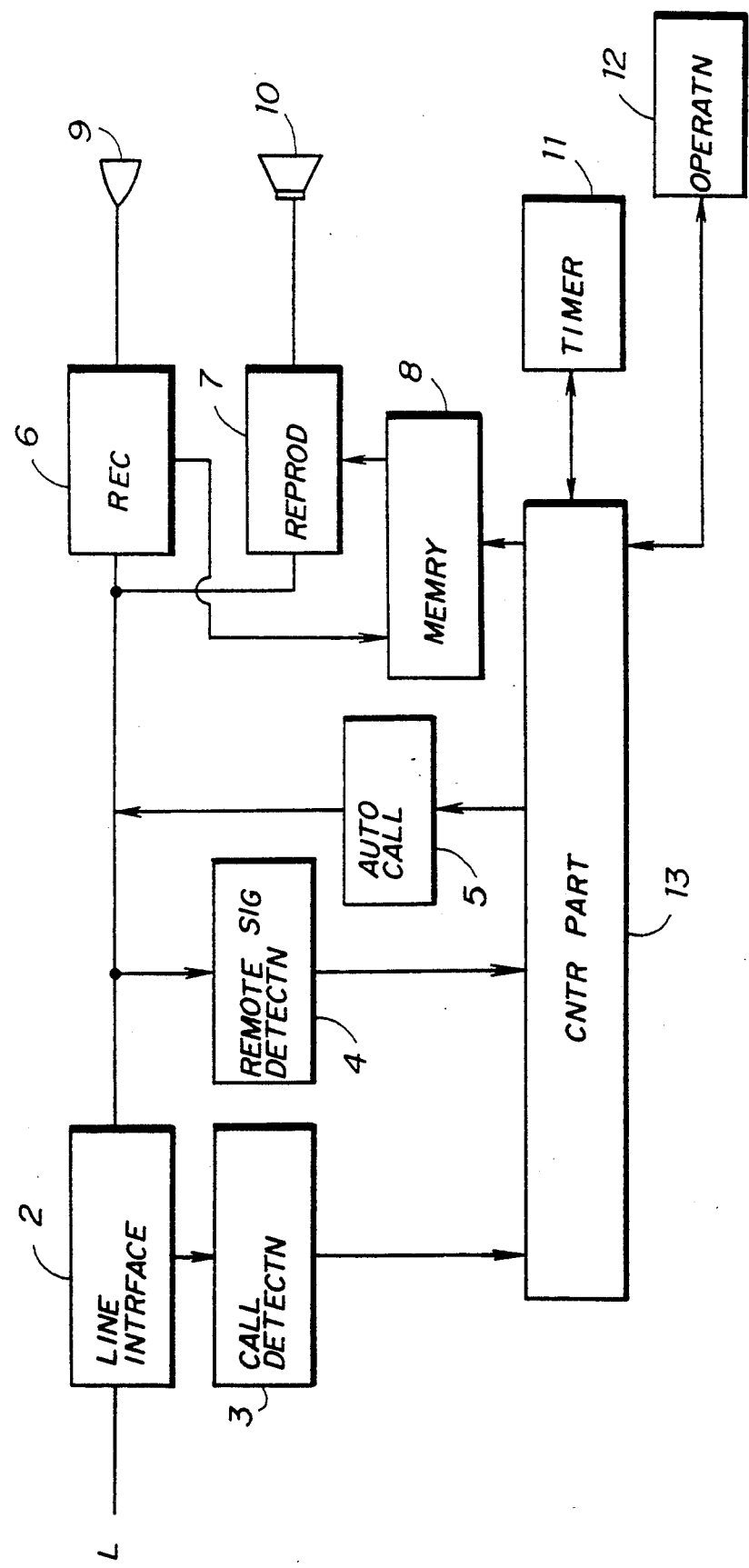
FIG. 1 is a block diagram showing a first embodiment of the communication apparatus having a data transfer function according to the present invention.

Referring first to FIG. 1, a description will be given of a first embodiment of the communication apparatus which is applied to a telephone apparatus.

As in the communication apparatus shown in FIG. 1, a telephone apparatus 1 comprises a line interface 2, a call detection circuit 3, a remote signal detection circuit 4, an auto transmission circuit 5, a recording circuit 6, a reproducing circuit 7, a memory part 8, a microphone 9, a speaker 10, a timer 11, an operation part 12, and a control part 13.

A telephone line L is connected to the line interface 2. A calling signal or ringing from the telephone line L is detected by the call detection circuit 3 and the result of the detection is supplied to the control part 13. A remote signal from the telephone line L, for example, a prescribed dial tone, is detected by the remote signal detection circuit 4, and the presence of the remote signal detected and the type of the remote signal identified are supplied to the control part 13. The operation of the auto transmission circuit 5 is controlled by the control part 13 so that a signal indicating a telephone number of a destination terminal is transmitted to the telephone line L. A speech signal which is generated from a speech inputted from the microphone 9 or a speech inputted from a dedicated microphone (not shown) is supplied by the recording circuit 6 to the telephone line L. The recording circuit 6 also records the speech signal in the memory part 8. The reproducing circuit 7 reproduces the speech signal stored in the memory part 8 and transmits the reproduced signal to the telephone line L or the speaker 10. The reproducing circuit 7 also converts the speech signal sent from the telephone line L into a speech which is audible to the user with the speaker 10.

The microphone 9 and the speaker 10 constitute a speech receiving/transmitting device. The memory part 8 is made up of, for example, a magnetic tape device, an IC memory or the like. In the memory part 8, a speech message or received information sent from the telephone line L and a reply message for transmission to the calling terminal during absence of an operator are stored. The telephone apparatus 1 is capable of carrying out the so-called absence recording, or automatically answering when a call is received during the absence and storing a speech message from the calling terminal in the memory part 8. And the information stored in the memory part 8 can be reproduced by the telephone apparatus 1. The timer 11 comprises an oscillator, a divider, etc. and is provided for measurement of the current time and for management of the transfer time periods. The operation part 12 comprises push buttons of ten keys, an asterisk key and the other keys. The operation part 1 is used by an operator to input a telephone number of a destination terminal by pushing the buttons of the ten keys and the other keys, and for registering a destination terminal's telephone number and a transfer time period. The transfer time period is a period of time for which the absence-recorded message is automatically transferred to a destination terminal.

The control part 13 includes a central processing unit (CPU), a read only memory (ROM), a random access memory (RAM) and the others. A basic operating program of the telephone apparatus 1 and a data transfer processing program relating to the present invention are stored in the ROM. And the RAM of the control part 13 is used for storage of several pieces of information necessary for controlling the telephone apparatus 1 as well as for storage of the destination terminal's telephone number and the transfer time period. A series of data may be stored in the RAM of the control part 13, which includes a plurality of transfer time period data and a plurality of destination terminals' telephone number data corresponding to the transfer time period data. When a call is received at an arbitrary time, the control part 13 checks the current time the call is received, determines which transfer time period data among those stored in the RAM corresponds to the current time so that a subject destination terminal's telephone number where the recorded information is transferred is found from the RAM, which is selected uniquely with the determined transfer time period. The control part 13 not only controls the sequences of the facsimile apparatus 1 according to the basic operating program stored in the ROM, but also carries out the data transfer procedure concerning the present invention.

Next, a description will be given of the data transfer procedure of the telephone apparatus 1, by referring to FIG. 2. Briefly in this first embodiment, a speech message from the calling terminal is recorded onto the memory part 8 and the recorded speech message is transferred to a destination terminal for a specified transfer time period.

For carrying out the data transfer procedure of the telephone apparatus 1, an operator has to give input data to the RAM of the control part 13, using the operation part 12. The input data includes a destination terminal's telephone number and a transfer time period. In this case, the data transfer is not limited only to a single destination terminal, several different destination terminals for separate transfer time periods may be may be registered in the RAM of the control part 13. For example, it is possible for the operator to register a first destination terminal A for a first transfer time period of 9:00 a.m. to 12:00 a.m. and a second destination terminal B for a second transfer time period of 1:00 p.m. to 3:00 p.m. When a call is received from a calling terminal at 10:00 a.m., the facsimile apparatus 1 automatically replies to the call and records information received from the calling terminal, and determines the destination terminal A to which the recorded information is transferred, because the current time of 10:00 a.m. belongs to the first transfer time period. After the input data registration is completed, the operator sets the telephone apparatus 1 in a transfer mode by using the operation part 12 in a similar manner.

Figure 2:
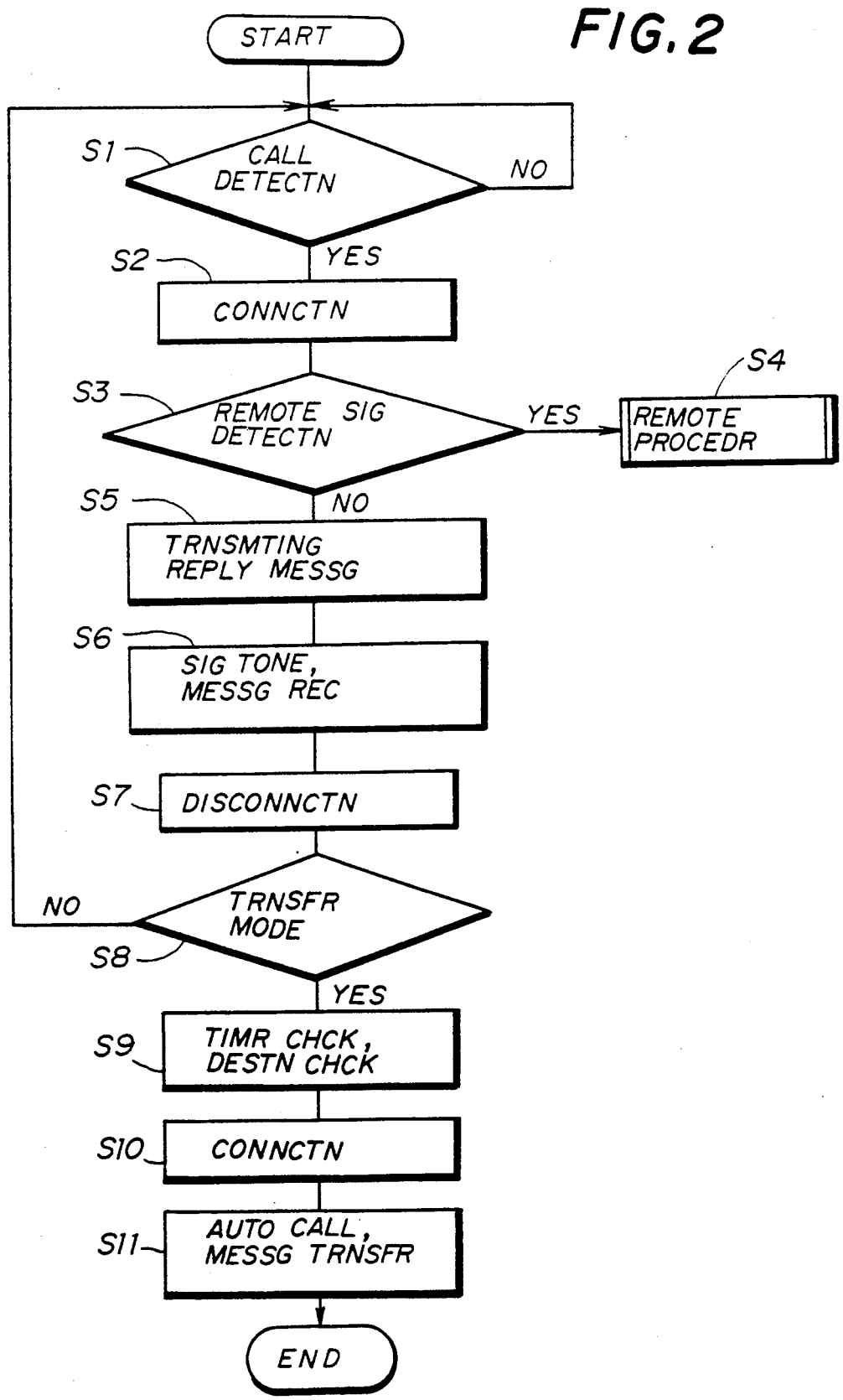
FIG. 2 is a flow chart of the data transfer procedure of the first embodiment.

As shown in FIG. 2, a step S1 detects a call received from a calling terminal by the telephone apparatus 1. If there is a call, then a step S2 connects the telephone apparatus 1 to the telephone line L. A step S3 checks whether a remote signal is supplied. If a remote signal is detected, then a step S4 shifts the operation mode of the telephone apparatus to a remote mode and carries out a prescribed remote procedure. The remote procedure includes a transfer mode setting and resetting, a destination terminal data input, change and deletion, and a transfer time period setting, data input, change and deletion. If the remote signal is not detected, then a step S5 carries out transmission of a reply message to the calling terminal. In this step S5, if an off-hook state is not detected for a prescribed time period, or it is not detected until a given number of ringings or calling signals are finished, then an auto calling procedure is carried out and the telephone line is connected. After the line connection, the reproducing circuit 7 and the memory part 8 are activated so that a reply message stored in the memory part 8 is transmitted. After announcement of the operator's absence and of the recording of a speech message to the operator starting after a prescribed tone is heard, the activation of the reproducing circuit 7 and the memory part 8 is stopped. Then, a step S6 generates the prescribed tone and actually carries out recording of a speech message or received information from the calling terminal to be stored in the memory part 8 by activating the recording circuit 6 and the memory part 8. After the speech message is recorded for a given time period, a step S7 disconnects the telephone apparatus from the telephone line. A step 8 checks if the telephone apparatus is set in the transfer mode. If the telephone apparatus is not in the transfer mode, then the transfer procedure is not performed and the processing is returned back to the step S1 awaiting a next call. If the telephone apparatus is set in the transfer mode, then a step S9 confirms the current time with reference to the timer 11, selects the transfer time period within which the current time is included, and reads out the destination terminal's telephone number corresponding to the selected transfer time period from the RAM of the control part 13. Next, a step S10 connects the telephone apparatus 1 to the telephone line L, then it automatically calls the destination terminal. After an off-hook state of the destination terminal is detected, a step S11 activates the reproducing circuit 7 and the memory part 8 so that the absence-recorded speech message (received information) is reproduced and transferred to the destination terminal.

Therefore, it is possible to transfer a speech message received by the telephone apparatus when a user is away to any destination terminal which is located at a place being scheduled to visit. And, to specify a plurality of destination terminals to which the speech message is transferred is also possible if different transfer time periods are specified for the respective destination terminals. Unlike the conventional apparatus, changing a destination terminal by remote operation each time a visiting place is altered is not required for the telephone apparatus 1 of the present invention. Thus, the present invention provides an easier to use, more convenient absence recording capability of the communication apparatus than that of the conventional apparatus. In the case where a single telephone apparatus 1 is used in common by a number of users, it is possible to make effective use of the single telephone apparatus by predetermining a different destination terminal for a separate transfer time period for each user so that the message is received at such a place which each user will visit.

Next, a description will be given of a second embodiment of the communication apparatus according to the present invention, by referring to FIGS. 3 and 4.

Figure 3:
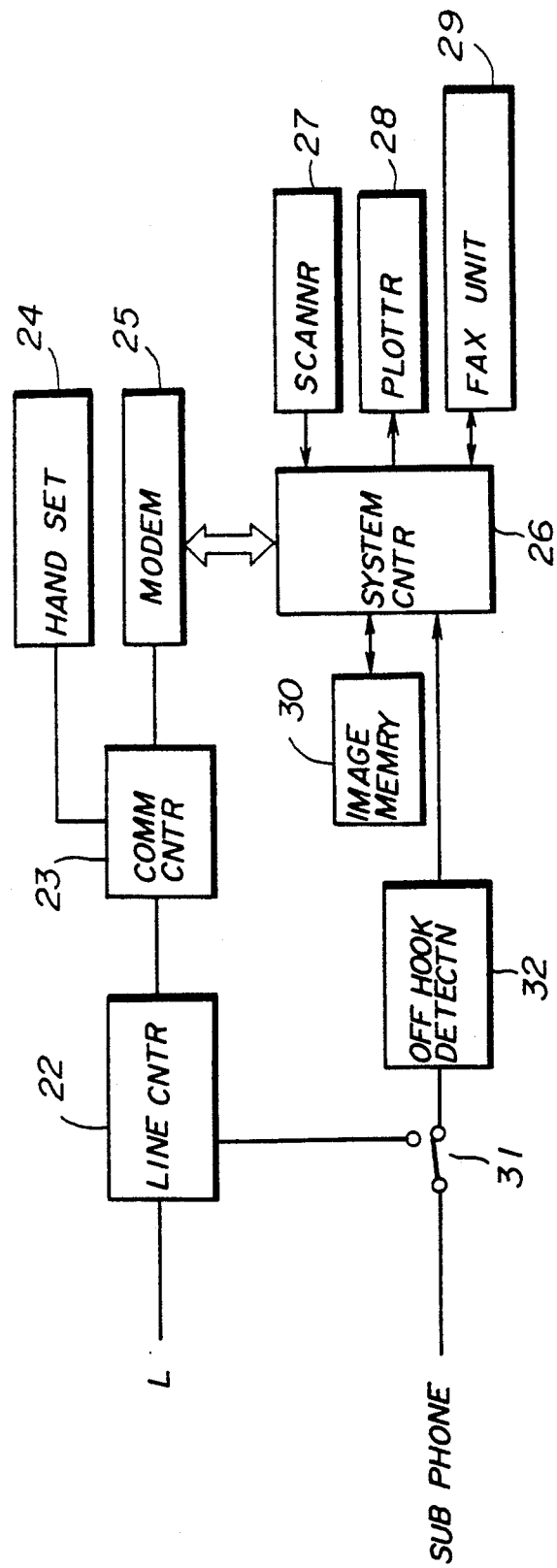
FIG. 3 is a block diagram showing a second embodiment of the communication apparatus having a data transfer function according to the present invention.

As in the communication apparatus shown in FIG. 3, a facsimile apparatus 21 comprises a line control part 22, a communication control part 23, a hand set 24, a modem 25, a system control part 26, a scanner 27, a plotter 28, a facsimile unit 29, an image memory part 30, a switch 31 and an off-hook detection circuit 32.

A telephone line L is connected to the line control part 22. The line control part 22 comprises a line protective circuit, a call detection circuit, a switch, and the others. The line control part 22 works under control of the system control part 26, and it carries out connection/disconnection of the telephone line by switching selectively between the communication control part 23 side and the switch 31 side. The line control part 22 also performs a call detection procedure. The communication control part 23 comprises a 2 wire-to-4 wire conversion circuit, an amplifier, a remote signal detection circuit and an auto transmission circuit. The communication control part 23 allows the hand set 24 to deal with a speech transmission and performs remote signal detection and auto calling procedures. The remote signal detection is to detect a remote signal transmitted from a calling terminal. The auto calling is to automatically send a call to a destination terminal with its telephone number specified. The hand set 24 including a microphone and a speaker is used for speech transmission. The modem 25 demodulates a received signal and modulates a transmitting signal.

The system control part 26 comprises a CPU, a ROM, a RAM and a timer. A basic operating program and a program executing the data transfer procedure concerning the present invention are stored in the ROM. The RAM of the system control part 26 is used for storage of several pieces of information necessary for controlling the facsimile apparatus 21 as well as for storage of the destination terminal's telephone numbers and the transfer time periods which relate to the present invention. A series of data containing a plurality of destination terminals, telephone numbers and corresponding transfer time periods can be stored in the RAM. The timer of the system control part 26 is provided for measurement of the current time and for management of the transfer time periods. The current time by the timer is used for the system control part 26 to determine the transfer time period to which the current time belongs, from among the plurality of transfer time period data stored in the RAM of the system control part 26. The system control part 26 controls operations of several parts within the facsimile apparatus 21 in accordance with the basic operating program stored in the ROM, as well as carries out the data transfer procedure relating to the present invention.

The scanner 27 scans a sending subject copy for supplying an image information. The plotter 28 records a received image information on a recording paper. The facsimile unit 29 generally represents other portions of the facsimile apparatus 21 necessary for operation, for example, an operation part, an encoder/decoder part, or the like. Using the operation part, an operator gives the input data to the system control part 26. The input data includes telephone numbers of destination terminals as well as transfer time periods. The operator also performs a data transfer mode setting with the operation part of the facsimile unit 29. The image memory 30 is used for storage of transmitting and received image information, and has a capacity to store several pages of image information. A sub telephone unit is connected to the switch 31. The switch 31 selectively connects the sub telephone unit to either the line control part 22 or the off-hook detection circuit 32. The off-hook detection circuit 32 detects an off-hook state of the sub telephone unit and supplies the result of the detection to the system control part 26.

Next, a description will be given of the data transfer procedure of the facsimile apparatus 21, by referring to FIG. 4. In this second embodiment, an image data received from the calling terminal is stored in the image memory part 30 and the image data is transferred to a destination terminal for a specified transfer time period, a telephone number of the destination terminal and the transfer time period being registered in the RAM of the system control part 26.

For carrying out the data transfer procedure of the facsimile apparatus 21, an operator has to give an input data including several telephone numbers of destination terminals and several transfer time periods for each of the destination terminals so that they are registered in the RAM of the system control part 26. Similarly to the above described first embodiment, the data transfer is not limited only to a single destination terminal, several different destination terminals for separate transfer time periods may be registered to carry out information transfer to several destination terminals for different transfer time periods.

As shown in FIG. 4, a step P1 checks if a call is received from an external facsimile terminal. If a call is received, then a step P2 connects the facsimile apparatus 21 to the telephone line L through the line control part 22. A step P3 checks if a remote signal is detected through the communication control part 23. If the remote signal is detected, a step P4 carries out the remote procedure similar to the first embodiment. If the remote signal is not detected, a step P5 carries out a normal image recording procedure with the image memory part 30. In this image recording procedure, an image data (received information) from the calling terminal is stored in the image memory part 30 after a prescribed facsimile control signal is exchanged between the facsimile apparatus 21 and the calling-side facsimile and a preparatory facsimile procedure is finished. When the image recording procedure is finished, a step P7 checks if the facsimile apparatus is set in the transfer mode. If the facsimile apparatus 21 is not in the transfer mode, then a record output procedure is carried out without performing the image transfer procedure and the processing is returned to the step P1, waiting for a next call being transmitted. If the facsimile apparatus 21 is in the transfer mode, then a step P8 checks the current time from the timer of the system control part 26 and reads out a telephone number of a subject destination terminal relevant to a transfer time period to which the current time belongs, several telephone numbers and several transfer time periods being stored in the RAM of the system control part 26. A step P9 connects the facsimile apparatus 21 to the telephone line L through the line control part 22. And, a step P10 transmits a call to the subject destination terminal through the communication control part 23, and, after an off-hook state of the destination terminal is detected, carries out a normal image transmission procedure in which the image information received is transferred to the subject destination terminal by reading out it from the image memory part 30.

Accordingly, it is possible to transfer the absence-recorded image information from the calling terminal while the user is away to his visiting place where a destination terminal is located. And it is possible to specify a plurality of destination terminals to which the image information is transferred if different transfer time periods are predetermined for the respective destination terminals. Unlike the conventional apparatus, changing a destination terminal by a remote operation due to the alteration of the visiting place is not required for the facsimile apparatus 21. Thus, the present invention provides improved availability and convenience of the facsimile apparatus. In the case where a single facsimile apparatus 21 is used in common by a number of people, it is possible to make effective use of the single facsimile apparatus by registering different destination terminals for separate transfer time periods for each person to receive the image information at such a place that he will visit actually.

Further, the present invention is not limited to these embodiments, but various variations and several modifications may be made without departing from the scope of the present invention.

What is claimed is:

1. A communication apparatus which replies to a call from a calling terminal through a data transmission path and records information being received from the calling terminal for transferring the recorded information to a predetermined destination terminal, said communication apparatus comprising:

recording means for recording said information received from the calling information after replying to the call;

memory means for storing a plurality of transfer time period date, user names, and a plurality of telephone number data of destination terminals corresponding to said plurality of transfer time period data and user names; and transferring means for transferring said information to said predetermined destination terminal by reading out said information from said recording means after said information is received from the calling terminal, wherein said communication apparatus calls a subject destination terminal with a telephone number data corresponding to a received user name and the transfer time period data stored in said memory means corresponding to the time when the call is received from the calling terminal, and transfers said information to said subject destination terminal each time the call is received from the calling terminal.

2. A communication apparatus as claimed in claim 1, wherein said communication apparatus further comprises control means for activating said transferring means and said memory means so that said information is reproduced and transferred to the subject destination terminal with a telephone number selected from those telephone number data stored in the memory means.

3. A communication apparatus as claimed in claim 2, wherein said communication apparatus further comprises timer means for measuring the current time that is provided for said control means to determine which transfer time period data does correspond to the current time among those stored in the memory means, so that a telephone number of a destination terminal corresponding to the received user name and to said transfer time period is selected as the subject destination terminal to be called when the information is transferred.

4. A communication apparatus as claimed in claim 3, wherein said communication apparatus further comprises operation means for inputting said plurality of transfer time period data, said user names and said plurality of telephone number data of destination terminals to said control means, said operation means being used for setting said communication apparatus in a data transfer mode.

5. A communication apparatus as claimed in claim 4, wherein said control means checks whether the communication apparatus is set in data transfer mode, so that the control means, in the case of the data transfer mode, determines which transfer time period data among those stored in the memory means does correspond to the current time being supplied from the timer means to select a telephone number of the subject destination terminal corresponding to said determined transfer time period and to said received user name, said subject destination terminal being called when said recorded information is transferred.

6. A communication apparatus as claimed in claim 4, wherein said communication apparatus further comprises reproducing means for reproducing said information recording in the recording means when said information is transferred to said subject destination terminal.

7. A communication apparatus as claimed in claim 6, wherein said control means includes the emory means, the timer means and the reproducing means, so that said control means checks that the communication apparatus is set in a data transfer mode, in the case of the communication apparatus being set in the data transfer mode, said control means being capable of checking the current time with the timer means to determine a telephone number of the subject destination terminal from the transfer time period data in the memory means which the current time belongs to, capable of checking said received user name with the user names stored in said memory means, and capable of reading out the recorded information from the recording means to transfer the same to the subject destination terminal.

8. A communication apparatus as claimed in claim 1, wherein said control means checks whether a remote signal is transmitted from the calling terminal, said communication apparatus carrying out a remote procedure in the case of the remote signal being received from the calling terminal, said remote procedure being carried out to make any change of operations of said communication apparatus from the calling terminal.

* * * * *